United States Patent Office 3,562,902
Patented Feb. 16, 1971

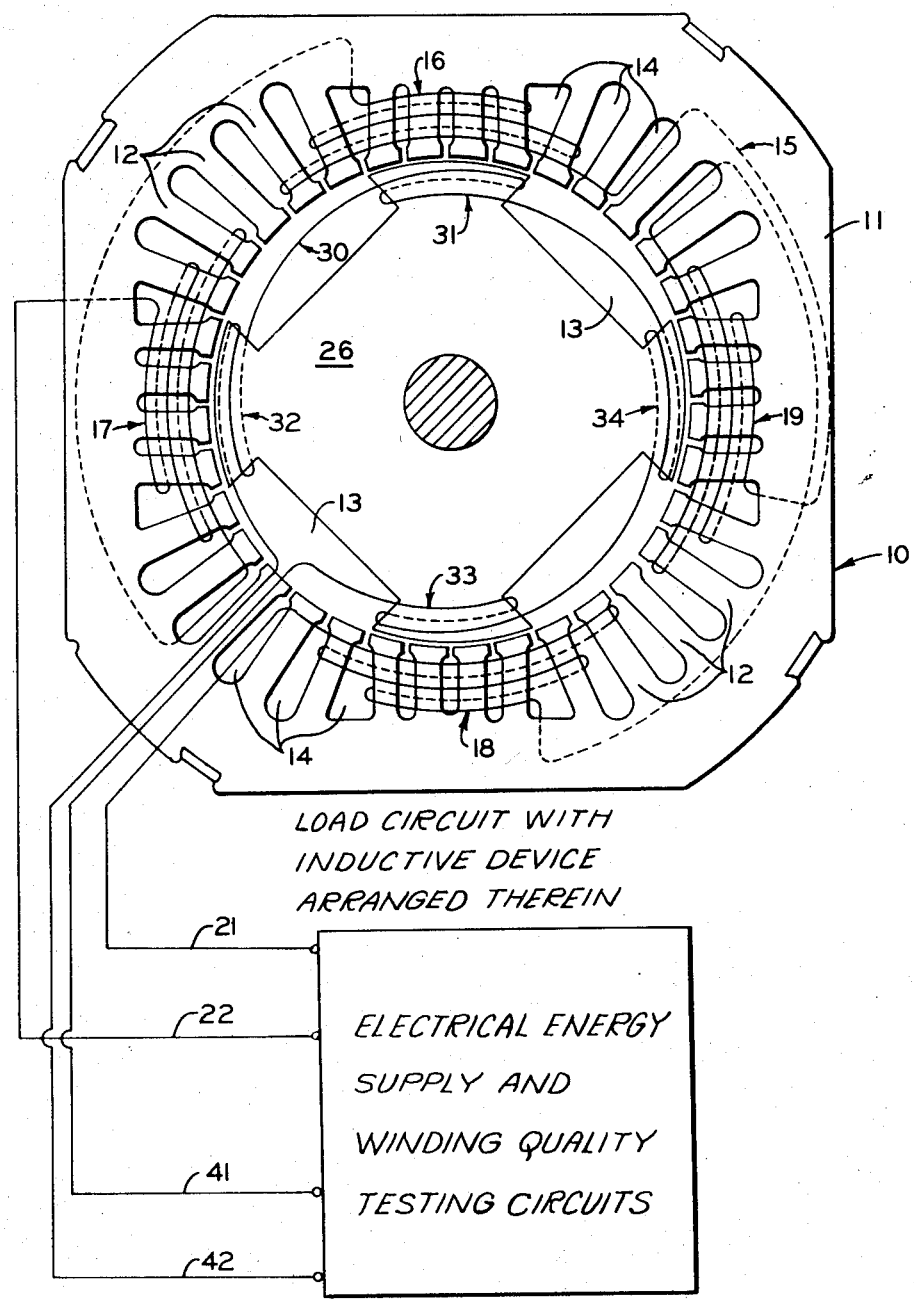

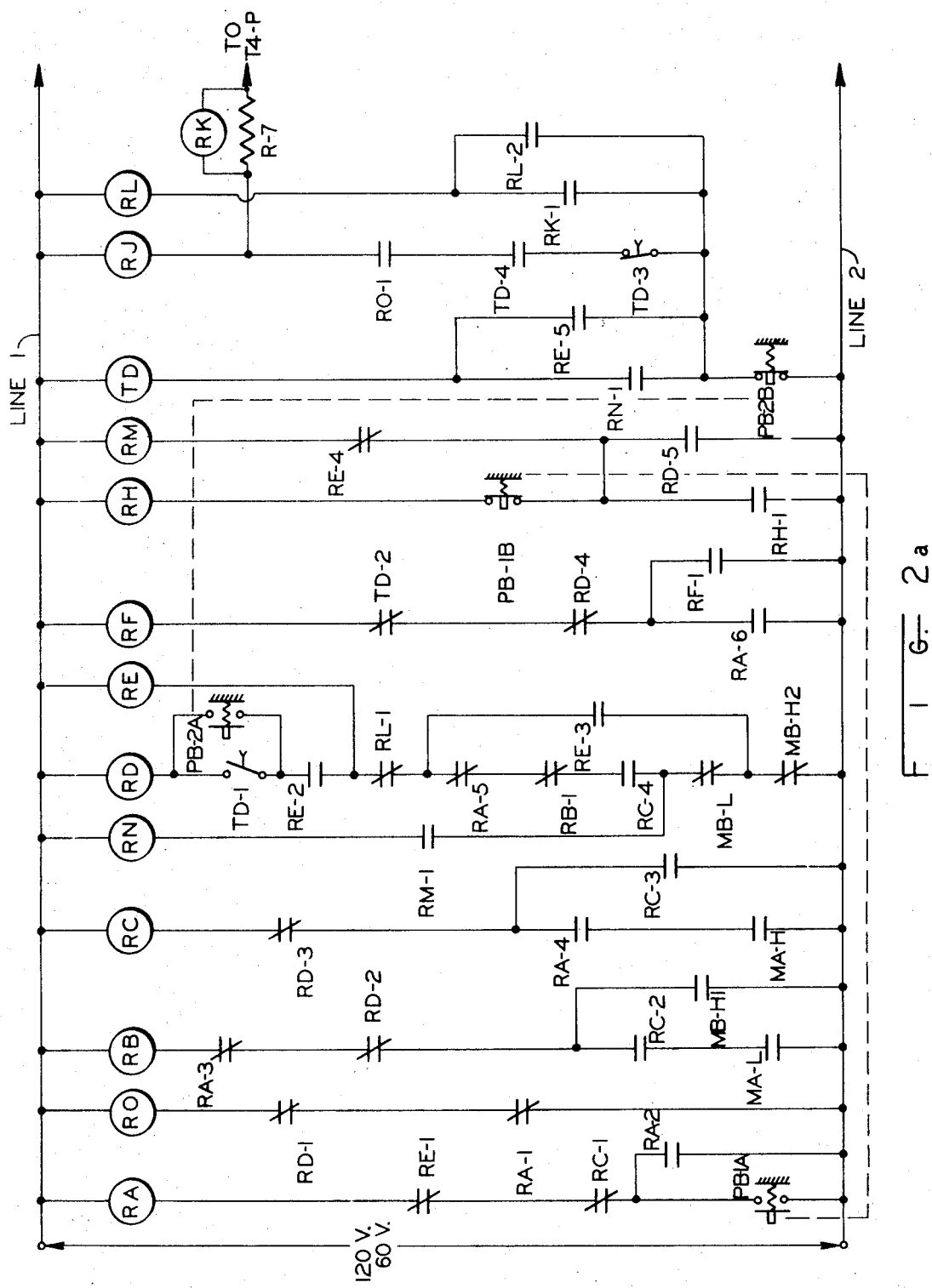

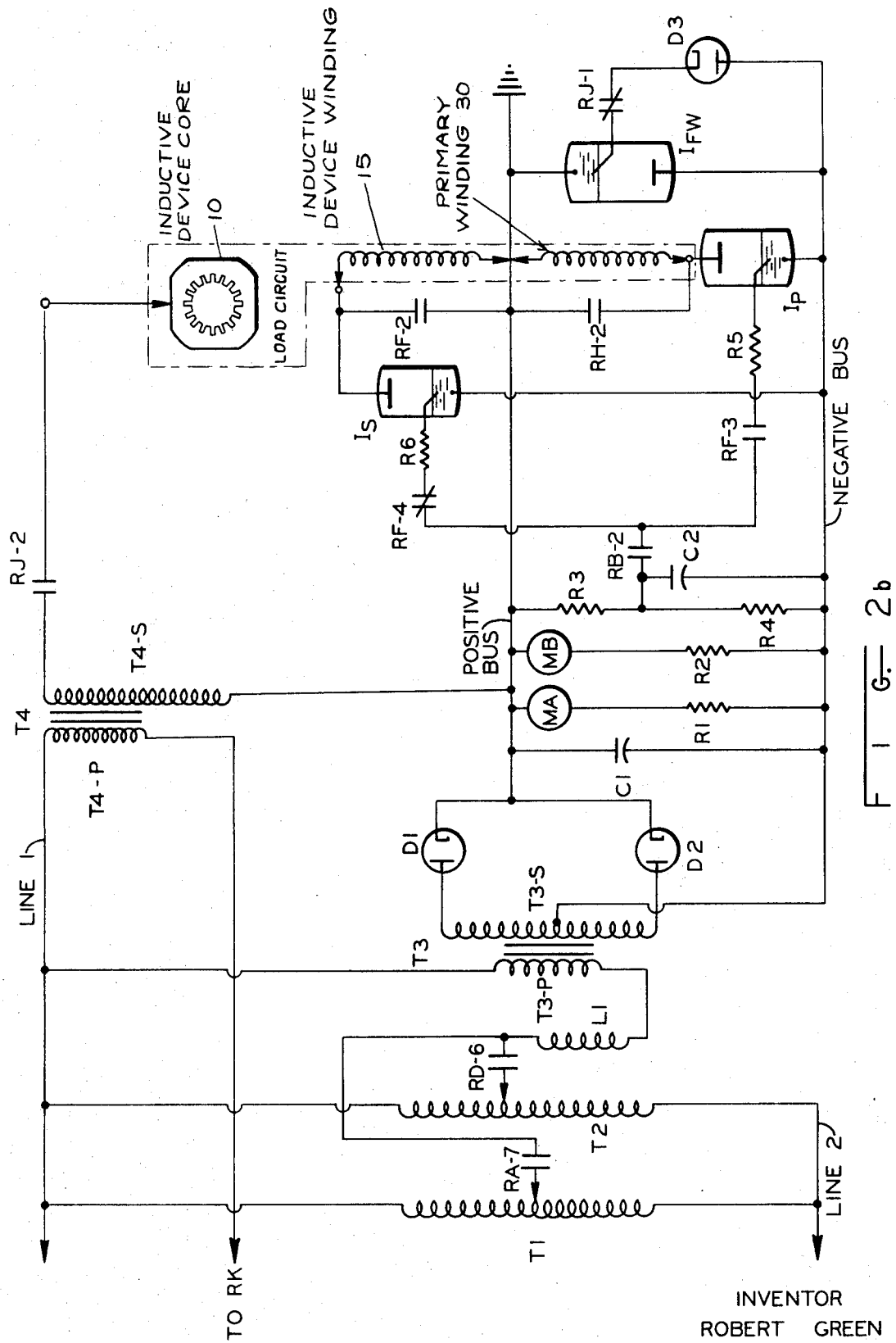

3,562,902
METHOD FOR TRANSFORMING AND TESTING OF ELECTRICAL COILS IN AN INDUCTIVE DEVICE
Robert Green, De Kalb, Ill., assignor to General Electric Company, a corporation of New York
Original application July 22, 1968, Ser. No. 746,663, now Patent No. 3,455,007, dated July 15, 1969. Divided and this application Jan. 10, 1969, Ser. No. 790,290
Int. Cl. H01h
U.S. Cl. 29—593                                    5 Claims

ABSTRACT OF THE DISCLOSURE

An inductive device, for instance a magnetic core having electrical coils or windings carried in slots, for arrangement in a load circuit. At least one pulse of electrical energy is selectively applied to the load circuit from an electrical energy supply circuit for transforming the coils from one configuration into another. A winding quality testing circuit, such as one to perform a high potential test, is then selectively connected to the load circuit for automatically conducting the test on the inductive device while it is still arranged in the load circuit to determine the quality of the device, such as detection of winding-to-ground faults. In the event that a winding defect is detected, further transformation of the electrical coils is discontinued. This interruption permits repair, if possible, of the coil and core at an early stage in the coil transformation. On the other hand, where the quality has been found to be satisfactory, another pulse of electrical energy may be selectively applied to the inductive device if desired to effect the desired transformation, with a second winding quality test being performed on the coil thereafter by once again connecting the winding quality testing circuit to the load circuit.

CROSS-REFERENCE TO RELATED APPLICATION

This is a division of my co-pending application, Ser. No. 746,663 filed July 22, 1968 now Pat. No. 3,455,007.

BACKGROUND OF THE INVENTION

My invention relates to a method for transforming and testing of electrical windings in an inductive device, and particularly to such method for automatically testing for short circuits between the electrical coils and the magnetic core carrying the coils after the desired transformation of the coils has been effected.

In the manufacture of inductive devices, electrical coils wound of insulated conductors are developed in the slots of magnetic cores into the desired configuration. Some of the more desirable procedures, as disclosed in U.S. Pat. Nos. 3,333,327–3,333,330 and 3,333,335 all issued Aug. 1, 1968, use electrical energy to perform various coil transforming operations. In one commercial application, a first pulse or surge of electrical energy, low in magnitude, is generated in the coils of the inductive device, usually to move coil side turn portions away from exposed or uninsulated parts of the magnetic core of the device for reasons explained in the C. E. Linkous Pat. 3,333,329. Thereafter, a second energy pulse of greater magnitude is generated in the coils to effect the desired transformation of the coils, for example, compaction and press-back of the coil side turn portions and end turn portions into the desired positions relative to the magnetic core.

It is highly desirable, before the second energy pulse having the larger magnitude is generated in the coils, to detect any faults which might exist in the coils, such as turn-to-turn, coil-to-coil, and coil-to-ground faults. Such defects may result from damaged wire insulation caused by faulty insulation material itself, improper coil handling, winding and coil insertion operations which damage the insulation, and on rare occasions from coil turns making contact with the magnetic core after the first low level energy pulse has been generated in the coils. Should the fault go undetected until the second energy pulse is generated in the coils, the coils and core may be severely damaged by the second energy pulse, even beyond the point of repair. On the other hand, detection of the faults may permit proper repair of the core and coils. Further, detection of such faults at an early stage in the manufacture or fabrication of the inductive device will effect savings in material, time, and labor. Consequently, it is quite desirable to conduct a coil quality test on the coil and core of the inductive device prior to the generation of a higher electrical energy pulse in the coil and especially before the complete manufacture of the inductive device. It is also desirable that the coil quality test be one that is well accepted in the industry, for instance the high-potential test in accordance with the National Electric Manufacturers Association (NEMA), (MG 1–12.02) dated Nov. 16, 1967, or the repetitive surge test (MG 12.04) in connection with AC and DC fractional and integral horsepower motors.

SUMMARY OF THE INVENTION

Accordingly, it is an object of the present invention to provide an improved method for transforming and testing the quality of electrical coils in an inductive device, and more specifically to overcome the problems and achieve the desirable features mentioned heretofore.

It is another object of the invention to provide an improved method for transforming electrical coils in a magnetic core of an inductive device and for conducting a coil quality test on the coil, such as the well known and widely accepted high-potential voltage test for detecting coil-to-ground faults.

It is yet another object of the invention to provide an improved method for testing for a short-circuited condition between an electrical coil and magnetic core, where the coil is being transformed from one configuration into another by pulses of electrical energy, and for preventing further pulses of energy to be supplied if a short circuit is detected.

Briefly, these and other objects are achieved in accordance with one form of my invention by an improved method in which the inductive device, in the illustrated embodiment, a magnetic stator core having at least one electrical coil or winding to be transformed, is initially arranged or coupled into a load circuit. Control means are employed to selectively connect the load circuit having the inductive device therein with either an electrical energy supply circuit means or a coil quality testing circuit, for example, a high-potential voltage testing circuit. When the load circuit and electrical energy supply circuit means are connected together, a pulse of electrical energy, for instance a low level energy pulse produced by the supply circuit means, is generated in the electrical coil to effect at least a partial transformation of the coil.

Thereafter, the coil quality testing circuit is activated while the inductive device is still maintained in the load circuit, and the coil is tested for quality, as by a repetitive surge or high-potential test, for detecting faults in the coil (e.g., coil-to-ground fault). Should one be detected, the control means prevents further generation of electrical energy pulses in the coil. Thus, early detection of coil defects is attained and savings in material, time, and labor achieved. On the other hand, if no fault is discovered, further transformation of the coil may be effected by generation therein of electrical energy pulses and the coil quality testing circuit subsequently reactivated to test the coil as before.

BRIEF DESCRIPTION OF THE DRAWINGS

The subject matter which I regard as my invention is particularly pointed out and distinctly claimed in the claims. The structure and operation of my invention, together with further objects and advantages, may be better understood from the following description given in connection with the accompanying drawing, in which:

FIG. 1 shows an end view of a stator core and coil which are coupled in a load circuit having a primary winding for illustrating a typical application of my invention when utilized in connection with the manufacture of electric motors; and FIGS. 2a and 2b show an electrical circuit diagram of a preferred embodiment of apparatus for transforming the electrical coil of FIG. 1 from one configuration into another using electrical energy pulses and for conducting a coil quality test on the coil in accordance with one form of the method of my invention.

DESCRIPTION OF THE PREFERRED EMBODIMENT

With reference to FIG. 1, by way of example only, the inductive device has been illustrated as an electric motor stator having a magnetic core 10 and electrical coils or windings to be transformed from one configuration into another in its slots by one form of my invention. It is to be understood, however, that my invention is equally applicable to other inductive devices having slotted structures carrying electrical coils or portions thereof. The stator core 10 of the exemplification is of generally conventional configuration and may be formed of laminated magnetic material having a yoke section 11 and a plurality of teeth 12 which define a bore 13 for receiving a rotor. The teeth 12 are separated by slots 14 which receive electrical coils of winding 15. In the illustrated exemplification winding 15 is distributed to provide a four pole construction, so that it includes four coil groups 16, 17, 18, 19, the four coil groups being serially connected and brought out on electrical winding leads 21, 22.

The illustrated manner in which the coils or winding 15 and magnetic core 10 are arranged in the load circuit incorporates a fixture of the type more completely disclosed in the C. E. Linkous Pat. 3,333,330. The fixture 26 is disposed in the bore 13 of core 10 and a primary winding 30 is held in a fixed relation with respect to the core. For reasons explained in the Linkous patent, including an inductive coupling or transformer relationship, the primary winding 30 has four magnetic poles similating those of winding 15, the poles being defined by serially connected coil groups 31–34 inclusive having leads 41, 42.

The core and coil structure arranged in the load circuit is electrically connected to the circuit of FIGS. 2a and 2b through the stator coil leads 21, 22, primary winding 30 and its leads 41, 42. After the load circuit is so connected, winding 15 is short-circuited, and primary winding 30 is supplied with a pulse of electrical energy of a preselected magnitude from an electrical energy supply circuit (to be discussed more fully hereinafter) to partially transform winding 15 by pushing its coil groups 16, 17, 18, 19 away from the stator bore 13. Without limiting the meaning of the term "transformation" or a variation thereof as used herein may include any one or more of the following: compaction of the coil turns into a tight bundle, change of relative positions of the turns or of the coil itself relative to the coil accommodating structure, change of coil contour, and force-back of the turn portions.

Subsequently, the load circuit is automatically connected to a winding or coil quality testing circuit, in the illustrated exemplification one capable of conducting a high-potential voltage test between winding 15 and magnetic core 10 to determine if any coil-to-ground fault exists in the inductive device. If no short-circuited condition is detected, then the winding 30 is short-circuited and winding 15 is supplied with a pulse of electrical energy of greater magnitude than the first pulse to further and completely transform winding 15 by forcing it into the desired position in or on the stator core 10. Then, the coil quality test is repeated between the winding 15 and the stator core 10. If no short circuit is indicated, winding 15 may be considered as properly transformed, and further manufacturing operations or steps may be performed on it as desired. If, on the other hand, a short circuit is indicated by either test, then the device can be inspected for repair or rejection at this particular stage. If the high energy pulses are supplied without the short circuit test, it is likely that the apparatus will be ruined or severely damaged.

FIGS. 2a and 2b are to be assumed to be connected together with the right hand leads of FIG. 2a connected to the corresponding left hand leads of FIG. 2b. Suitable electrical power, such as 120 volts at 60 cycles, is supplied to the circuits through switches, not shown, and connected to a line 1 and a line 2. The circuits utilize a number of relays whose operating windings are indicated by a circle containing the prefix letter R for relay and a suffix letter to indicate a particular relay. The associated contacts for each relay are indicated by the same two letters followed by a number to designate the particular set of contacts. The circuit also utilizes a time delay relay TD which has time delayed contacts TD–1, TD–3, and rapid operating contacts TD–2, TD–4. The time delay relay TD may be set so that its time delayed contacts TD–1, TD–3 operate after any desired length of time, such as one or two seconds for example, following energization of the time delay relay TD. The various relay contacts are shown in their open or closed position in response to their respective relays being deenergized. In addition, the circuit utilizes two voltage sensitive relays (sometimes called meter relays) MA and MB. These relays MA and MB have a selectable zero or low voltage sensing position L, and a selectable upper or high voltage sensing position H. The voltage sensitive relay MA has a set of contacts MA–L which are normally open for when zero voltage is sensed, but which close when any voltage in excess of zero is sensed. The relay MA also has a set of contacts MA–H which are normally open for any sensed voltage below the selected high voltage, but which close in response to a sensed voltage equal to or greater than the selected high voltage. Similarly, the relay MB has a set of contacts MB–L which are normally closed for a zero sensed voltage, but which open when any voltage in excess of zero is sensed. The relay MB also has two sets of contacts MB–H1 and MB–H2. The contacts MB–H1 are open and the contacts MB–H2 are closed for any sensed voltage below the selected high voltage, and the contacts MB–H1 are closed and the contacts MB–H2 are open for a sensed voltage equal to or greater than the selected high voltage. The selected high voltage for the relay MA is lower or less than the selected high voltage for the relay MB. A first manually operated pushbutton PB–1 is provided to start operation. This pushbutton has a set of normally open contacts PB–1A and a set of normally closed contacts PB–1B. The contacts PB–1A, PB–1B operate together as indicated by the dashed line. A second manually operated pushbutton PB–2 is provided if the coil quality test is to be skipped or omitted. This pushbutton has a set of normally open contacts PB–2A and a set of normally closed contacts PB–2B. The contacts PB–2A, PB–2B also operate together as indicated by the dashed line.

With particular reference to FIG. 2b, exemplifications of the circuits are shown for supplying the pulses of energy for coil transformation of winding 15 and for providing the coil quality test. This power supply includes two autotransformers T1, T2 which are connected across the lines 1 and 2. Each of the autotransformers T1, T2 has a movable tap for selecting a voltage for the insertion pulse. The taps are connected through relay contacts RA–7, RD–6 respectively to a choke coil L1. The choke coil L1 is connected to the primary winding T3–P of a charging power transformer T3. The secondary winding T3–S of the transformer T3 is connected to the anodes of two diode rectifiers (which may be gas filled tubes with heating filaments) D1, D2 in conventional rectifier fashion. A positive bus is connected to the cathodes of the rectifiers D1, D2, and a negative bus is connected to a center tap of the secondary winding T3–S. An energy storage capacitor C1 (which may include a number of parallel sections) is connected between the positive and negative buses. The voltage sensitive relays MA, MB are also connected through respective current limiting resistors R1, R2 between the positive and negative buses. A voltage divider comprising two resistors R3, R4 is connected between the positive bus and the negative bus, and a firing capacitor C2 is connected across the resistor R4.

The voltage on the firing capacitor C2 is supplied through relay contacts and resistors R5, R6 to one of two starting electrodes of two voltage switching devices, such as the two ignitrons $I_P$ and $I_S$. The cathodes of the ignitrons $I_P$ and $I_S$ are connected to the negative bus, and their anodes are provided with suitable terminals so that one end of the primary winding 30 and one end of the winding 15 can be easily connected to the respective anodes. The other ends of the two windings which will be inductively coupled during the generation of electrical pulses in winding 15 are connected to the positive bus which may be grounded. A free wheeling circuit is provided between the positive and negative buses by the ignitron $I_{FW}$ in order to prevent reverse voltages from being applied to the plug coil 30 and the stator coil 15. This free wheeling ignitron $I_{FW}$ is triggered by a diode rectifier D3, which may also be a gas filled device having a heater filament. A high potential testing transformer T4 is provided with its primary winding T4–P connected to the line 1, and through a voltage sensing resistor R7 and relay contacts to the line 2. The secondary winding T4–S of the transformer T4 is connected to the positive bus and through a set of contacts RJ–2 to which the stator core 10 can be connected. Since the positive bus is preferably grounded, magnetic core 10 must be insulated from such grounding.

When an inductive device, such as the stator core 10 and winding 15 shown in FIG. 1, is assembled, the stator coils are distributed in core 10 but not fully formed into the desired configuration by any suitable means, such as by a machine or placed by hand. When the coil transformation and test are to be made, the core 10 is positioned on fixture 26 in the load circuit. The relay contacts RJ–2 are connected to the core 10, the primary winding 30 is connected to the positive bus and the anode of an ignitron $I_P$, and winding 15 is connected between the positive bus and the anode of an ignitron $I_S$. With energy supplied to line 1 and line 2, the operation of the circuits of FIGS. 2a and 2b will be described in four phases, namely, partial coil transformation, the first coil quality test, the additional coil transformation, and the second coil quality test.

PARTIAL COIL TRANSFORMATION

The start pushbutton PB–1 is depressed. The contacts PB–1B open to deenergize the relay RH, which was left energized from a previous cycle or operation. The contacts PB–1A close, and this serves to energize the relay RA through the closed contacts RE–1, RC–1. When the relay RA becomes energized, its normally open contacts RA–2, RA–4, RA–6, RA–7 close, and its normally closed contacts RA–1, RA–3, RA–5 open. Closing of the contacts RA–2 keeps the relay RA energized when the pushbutton contact PB–1A opens. Opening of the contacts RA–1 insures that the relay RO is deenergized so that the coil quality test can not be applied at this time. Closing of the contacts RA–6 energizes the relay RF through the closed contacts TD–2, RD–4. Closing of the contacts RA–7 connects the tap on the autotransformer T1 to the choke coil L1 so that the transformer T3 and the charging circuit are energized by the voltage selected from the autotransformer T1.

As mentioned, the relay RF is energized by closing of the contacts RA–6. The normally open contacts RF–1, RF–2, RF–3, close, and the normally closed contacts RF–4 open. Closing of the contacts RF–1 keeps the relay RF energized even after the relay RA becomes deenergized. Closing of the contacts RF–2 short circuits the stator winding 15. Closing of the contacts RF–3 connects the starting electrode of the ignitron $I_P$ to one side of the contacts RB–2, and opening of the contacts RF–4 disconnects that starting electrode of the ignitron $I_S$ from the contacts RB–2.

Thus, at this point, the transformer T3 is connected to the autotransformer T1 so that the energy capacitor C1 can charge. The stator coil 15 is short-circuited. The ignitron $I_S$ is disconnected so it can not start, and the ignitron $I_P$ is connected to one side of the contacts RB–2 so as to be fired when the contacts RB–2 close.

As the voltage on the energy capacitor C1 increases, the voltage sensitive relays MA, MB begin to respond, as mentioned, the selected high voltage response level for the relay MA is lower than the selected high voltage response level for the relay MB. Hence, the contacts MA–H will close before the contacts MB–H1, MB–H2 close. When the contacts MA–H close, the relay RC is energized through the normally closed contacts RD–3, the now closed contacts RA–4, and the now closed contacts MA–H.

When the relay RC is energized, its normally open contacts RC–2, RC–3, RC–4 close, and its normally closed contacts RC–1 open. Opening of the contacts RC–1 deenergizes the relay RA. Deenergizing of the relay RA opens the contacts RA–7 so that the energy capacitor C1 receives no further charge. Closing of the contacts RC–3 seal in the relay RC around the contacts RA–4, MA–H. And closing of the contacts RC–2 energizes the relay RB through the now closed contacts RA–3, the normally closed contacts RD–2, the now closed contacts RC–2, and the now closed contacts MA–L.

When the relay RB is energized, its normally open contacts RB–2 close and its normally closed contacts RB–1 open. Closing of the contacts RB–2 connects one side of the firing capacitor C2 through the now closed contacts RF–3 to the starting electrode of the ignitron $I_P$. The other side of the firing capacitor C2 is connected to the cathode of the ignitron $I_P$, so that the ignitron $I_P$ fires. This permits the stored energy in the energy capacitor C1 to flow from the positive bus through the primary winding 30, in the load circuit through the ignitron $I_P$ from its anode to its cathode, and back to the negative bus. Current flow in this one direction is maintained through the primary winding 30 by the free wheeling ignitron $I_{FW}$ which may be fired by the diode rectifier D3 if such a reverse current attempts to flow through the plug coil 30 as the energy capacitor C1 discharges. Thus, an electrical pulse of energy is supplied to the primary winding 30, and by the type of inductive coupling discussed more completely in Pat. 3,333,330 an electrical energy pulse is generated in winding 15 to effect partial transformation of the winding by pushing the side turn portions away from the bore 13 back into slots 14, and by also pushing the end turn portions back away from the bore opening 13.

As the voltage in the energy capacitor C1 reduces in level, the voltage sensitive relays MA, MB respond. When the voltage across the energy capacitor C1 falls to the selected low level, the contacts MA–L open again. Opening of the contacts MA–L deenergizes the relay RB, and this serves to open the contacts RB–2 so that the firing capacitor C2 is removed from possible connection to the ignitrons $I_P$ and $I_S$.

FIRST COIL QUALITY TEST

Also, as the voltage across the energy capacitor C1 falls, the voltage sensitive relay MB responds, and its contacts MB–L close in response to some low voltage level. Closing of the contacts MB–L serves to energize the relay RE through the closed contacts RL–1, the now closed contacts RA–5, the now closed contacts RB–1, the now closed contacts RC–4, the contacts MB–L, and the now closed contacts MB–H2. When the relay RE is energized, its normally open contacts RE–2, RE–3, RE–5 close, and its normally closed contacts RE–1, RE–4 open. Closing of the contacts RE–3 seals in the relay RE around the contacts RA–5, RB–1, RC–4, MB–L. Closing of the contacts RE–5 serves to energize the time delay relay TD, and start the high potential test. When the time delay relay TD is energized, its rapid contacts TD–2 open and deenergize the relay RF. When the relay RF is deenergized, its contacts RF–2 open and remove the short circuit from the stator coil 15.

It should be noted that the relay RO is energized again through the now closed contacts RA–1, RD–1. Thus, the relay RJ is energized through the now closed contacts RO–1, the now closed contacts TD–4, and the closed contacts TD–3 which have not yet opened. Energizing of the relay RJ closes the contacts RJ–2 and connects the secondary winding T4–S to the stator core 10, and at the same time connects the primary winding T4–P to the line 2 through the resistor R7 and the relay RK, and the contacts RO–1, TD–4, TD–3, PB–2B. The contacts RJ–1 open and remove possible firing of the ignitron $I_{FW}$. With voltage applied to the primary winding T4–P, a high voltage is applied between the stator core 10 and the winding 15 to conduct a high potential voltage test. This voltage is applied for the time duration selected for the time delay relay TD.

If a short circuit condition is found to exist between the stator core 10 and winding 15, a current flows in the secondary winding T4–S. This current causes a current to flow in the primary winding T4–P and produces a voltage across the voltage sensing resistor R7. This voltage in turn serves to energize the relay RK. If the relay RK is energized, its normally open contacts RK–1 close and energize the relay RL. The normally open contacts RL–2 close and seal the relay RL in an energized condition. The energized relay RL opens the contacts RL–1 to deenergize the relay RE. This opens the contacts RE–5 to deenergize the time delay relay TD. The time delay relay contacts TD–4 open to deenergize the relay RJ and terminate the coil quality test. The faulty core 10 and winding 15 can be removed for examination and repair, and another core 10 and coil 15 can be installed in the load circuit.

If no fault or defect is discovered, then of course, the relay RK does not become energized. The test voltage is supplied to the stator core 10 and the winding 15 until the time period of the time delay relay TD expires. At the end of this period, the contacts TD–3 open and deenergize the relay RJ. This stops the test by removing power from the primary winding T4–P and disconnecting the secondary winding from the stator core 10. The contacts TD–1 also close to energize the relay RD which begins the next phase, namely the second insertion pulse. The time delay relay TD remains energized until the cycle is complete, as will be explained. This keeps the contacts TD–2 open so that the relay RF remains deenergized.

ADDITIONAL COIL TRANSFORMATION

When the contacts TD–1 close, the relay RD is energized through these contacts TD–1, the now closed contacts RE–2, the closed contacts RL–1 (since there was no defect), the closed contacts RE–3, and the closed contacts MB–H2. The relay RF was deenergized during the first high-potential test, so that the contacts RF–3 are open to disconnect the starting electrode of the ignitron $I_P$, and the contacts RF–4 are closed to connect the starting electrode of the ignitron $I_S$ to the contacts RB–2. When the relay RD is energized, its contacts RD–6 connect the tap of the autotransformer T2 to the choke coil L1 so that the power transformer T3 supplies a different, and usually higher, level of energy to the energy capacitor C1. The contacts RD–5 are closed to energize the relay RH. This short circuits the plug coil 30 through the contacts RH–2, and seals the relay RH through the contacts RH–1.

Thus, at this point, the energy capacitor C1 is being charged by the voltage level supplied by the autotransformer T2, the contacts RF–3 are open so that the ignitron $I_P$ can not fire, the contacts RF–4 are closed so that the ignitron $I_S$ can be fired, and the primary winding 30 is short-circuited.

As the voltage across the capacitor C1 rises, the voltage sensitive relays MA, MB respond. The relay MA responds at a lower level, but the closing of its contacts MA–H have no effect. When the voltage reaches a point such that the relay MB responds, the contacts MB–H2 open. Opening of the contacts MB–H2 deenergizes the relay RD and the relay RE. The contacts RE–5 open and deenergize the time delay relay TD. When the relay RD is deenergized, its normally open contacts RD–5, RD–6 open, and its normally closed contacts RD–1, RD–2, RD–3, RD–4 close. When the relay RD is deenergized, the contacts RD–6 open and remove further charging voltage from the energy capacitor C1. Closing of the contacts RD–2 energizes the relay RB through the now closed contacts RA–3, the contacts RD–2, and the now closed contacts MB–H1. With the relay RB energized, the contacts RB–2 close and connect the firing capacitor C2 through the now closed contacts RF–4 to the starting electrode of the ignitron $I_S$. This fires the ignitron $I_S$, and permits the energy capacitor C1 to discharge through the stator coil 15 from the positive bus, through the stator coil 15, through the ignitron $I_S$, and back to the negative bus. The ignitron $I_{FW}$ prevents reverse flow of current through the stator coil 15 during this time. As the pulse of energy is supplied to the winding 15, winding 15 is further transformed in the slots 14 of the stator core 10, and the coils are compacted into the desired positions relative to the core.

As the electrical energy pulse is generated in winding 15, the voltage across the energy capacitor C1 drops. When the voltage reaches zero or some selected low value, the contacts MA–L open. Ultimately relay RB becomes deenergized. When the relay RB is deenergized, the contacts RB–2 open so that the ignitron $I_S$ remains turned off after the energy in the capacitor C1 is dissipated. Thus, the pulse for additional transformation is completed.

SECOND COIL QUALITY TEST

Subsequent to the completion of the additional transformation, the second coil quality test is applied between the stator core 10 and winding 15. At this point, it will be recalled that the relay RH was energized for the second pulse. When the relay RH is energized, it is sealed in through its contacts RH–1. These contacts energize the relay RM through the now closed contacts RE–4, since the relay RE was deenergized during the second insertion pulse. With the relay RM energized, its contacts RM–1 close so that the relay RN is energized through the now closed contacts RM–1, and the now closed contacts MB–L, MB–H2. The relay contacts RN–1 now energize the time delay relay TD to start the second high-potential test. At this point, the sequence in the second coil quality test, e.g., high-potential test in the exemplification, is the same as the sequence described for the first test, the only difference being that the time delay relay TD is energized by the contacts RN–1 instead of the contacts RE–5. The same tests are made, and the same operation is provided depending upon whether a coil-to-ground fault is detected or is not detected. After the second high-potential test, if there is no short circuit, the operation is complete, and the stator core 10 with its now fully transformed stator winding 15 may be removed from the load circuit for subsequent manufacturing or assembly procedures.

After the second coil quality test, the relays RA, RB, RC, RD, RE, and RF are in deenergized condition. The relay RH is energized, but will be deenergized when the pushbutton contacts PB–1B are opened to start a new cycle for a new stator core and winding. The relay RJ is also deenergized. The relays RK and RL are deenergized if there was no short circuit. Should a fault in quality be detected, such as a short circuit, these relays RK and RL can be deenergized by operating the contacts PB–2B. (In this connection, if the high-potential test is to be omitted or skipped, the pushbutton PB–2 may be operated.) The relay RM is energized, but will be deenergized when the push-button contacts PB–1B are opened on the next cycle to deenergize the relay RH and open the contacts RH–1. The relay RN is deenergized when the contacts RM–1 open. The relay RO normally is energized and is deenergized only when the energy capacitor C1 is permitted to charge in response to energization of the relay RA or the relay RD. The time delay relay TD is left energized after the second high-potential test, but will be reset when the pushbutton PB–1 is operated. Operation of pushbutton PB–1 deenergizes the relay RH, the contacts RH–1 open and deenergize the relay RM, the contacts RM–1 open and deenergize the relay RN, and the contacts RN–1 open and deenergize the time delay relay TD.

SUMMARY OF ADVANTAGES

It will thus be seen that my invention provides a new and improved method for electrically transforming coils in a magnetic core, and for providing a coil quality test of the winding after the transformation of the winding. My invention permits an automatic operation so that the transformation may continue through its various stages if no faults are detected, but so that the transformation is stopped if one is discovered. Persons skilled in the art will appreciate that modifications may be made to my invention. By way of illustration the energy of each electrical energy pulse may have any desired value. The voltage level and the time duration of each coil quality test may be set as desired. Also, the generation of the desired electrical energy pulse may be accomplished without use of a primary winding in the manner discolsed in Pats. 3,333,328; 3,333,329; and 3,407,468. Further, a repetitive type surge test or other coil qualtiy test may be employed, if desired. Therefore, while my invention has been described with reference to a particular embodiment, it is to be understood that modifications may be made without departing from the spirit of the invention or from the scope of the claims.

What I claim as new and desire to secure by Letters Patent of the United States is:

1. A method for transforming at least one electrical coil of an inductive device from one configuration into another and for testing the quality of the at least one electrical coil comprising the steps of:
   (a) arranging the inductive device having the at least one electrical coil in a load circuit;
   (b) generating at least one pulse of electrical energy in the at least one electrical coil for creating electromagnetic forces to act on the at least one electrical coil for at least partially transforming it from one configuration into another;
   (c) and subsequently connecting the load circuit with a coil quality testing circuit and conducting a coil quality test on the at least one electrical coil while the inductive device is connected in the load circuit to determine possible defects in the at least one electrical coil, whereby additional manufacturing steps may be discontinued should a coil defect be indicated by the coil quality test.

2. The method of claim 1 in which the subsequently connecting the load circuit with a coil quality testing circuit and conducting a coil quality test includes applying a high-potential voltage across the at least one electrical coil and a magnetic part of the inductive device to determine if any short-circuited condition exists therebetween.

3. The method of claim 1 including the additional step of generating another pulse of electrical energy in the at least one electrical coil as the inductive device is maintained in the load circuit to further transform the at least one electrical coil into the desired configuration.

4. A method for transforming an electrical winding, carried in a dynamoelectric machine magnetic core, from one configuration into another and for testing the quality of the winding comprising the steps of:
   (a) arranging the magnetic core carrying the winding in a load circuit;
   (b) generating at least one pulse of electrical energy in the winding for creating electromagnetic forces to act on the winding for at least partially transforming it from one configuration into another;
   (c) and subsequently connecting the load circuit with a quality testing circuit and conducting a quality test on the winding while the magnetic core is connected in the load circuit to determine possible defects in the winding, whereby additional manufacturing steps may be discontinued should a winding defect be indicated by the quality test.

5. The method of claim 4 in which the subsequently connecting the load circuit with a quality testing circuit and conducting a quality test includes applying a high-potential voltage across the winding and magnetic core to determine if any short-circuited condition exists therebetween, and where a short-circuited condition is not indicated, generating at least one more pulse of electrical energy in the winding as the inductive device is maintained in the load circuit to further transform the winding into the desired configuration.

References Cited

UNITED STATES PATENTS

| | | | |
|---|---|---|---|
| 3,333,330 | 8/1967 | Linkous | 29—596 |
| 3,483,470 | 12/1969 | Tsergas | 324—51X |

JOHN F. CAMPBELL, Primary Examiner

C. E. HALL, Assistant Examiner

U.S. Cl. X.R.

29—596, 606; 324—51